US006407838B1

United States Patent
Canoglu et al.

(10) Patent No.: US 6,407,838 B1
(45) Date of Patent: Jun. 18, 2002

(54) RECONFIGURABLE MULTI-ADD/DROP MODULE FOR OPTICAL COMMUNICATIONS

(75) Inventors: Ergun Canoglu; Sabeur Siala, both of Sunnyvale, CA (US)

(73) Assignee: LuxN, Inc., Sunnyvale, CA (US)

( * ) Notice: Subject to any disclaimer, the term of this patent is extended or adjusted under 35 U.S.C. 154(b) by 0 days.

(21) Appl. No.: 09/619,417

(22) Filed: Jul. 19, 2000

Related U.S. Application Data
(60) Provisional application No. 60/144,909, filed on Jul. 21, 1999.

(51) Int. Cl.[7] .......................... H04J 14/02; H04J 14/08; H04B 10/20; H04B 10/24
(52) U.S. Cl. ...................... 359/127; 359/119; 359/131; 359/138; 359/114; 359/124
(58) Field of Search ............................ 359/127, 138, 359/115, 118, 119, 124, 227, 230, 232, 580, 587

(56) References Cited

U.S. PATENT DOCUMENTS

| | | | | |
|---|---|---|---|---|
| 5,042,889 A | | 8/1991 | Benzoni ....................... 385/16 |
| 5,164,858 A | * | 11/1992 | Aguilera, Jr. et al. ....... 359/587 |
| 5,537,247 A | * | 7/1996 | Xiao ........................... 359/368 |
| 5,706,375 A | | 1/1998 | Mihailov et al. ............. 385/24 |
| 5,712,932 A | | 1/1998 | Alexander et al. ............ 385/24 |
| 5,812,291 A | * | 9/1998 | Bendelli et al. ............. 359/129 |
| 5,822,095 A | | 10/1998 | Taga et al. ................... 359/127 |
| 5,859,717 A | * | 1/1999 | Scobey et al. ............... 359/124 |

OTHER PUBLICATIONS

Guardino, R.; Blumenthal, D.J., "Remote Provisioning of a Reconfigurable WDM Multichannel Add/Drop Multiplexer," *IEEE Photonics Technology Letters*, 1999, pp 1060–1062.

* cited by examiner

*Primary Examiner*—Leslie Pascal
*Assistant Examiner*—M. R. Sedighian
(74) *Attorney, Agent, or Firm*—David H. Jaffer; Pillsbury Winthrop LLP

(57) ABSTRACT

A reconfigurable multi-add/drop module for optical communications. The system includes a first network interface GRIN lens collimator connected on one end to an optical fiber of a communications network. An output of the GRIN lens is directed to a series of slidable two-section channel filters. Each filter is mechanically movable to a first position that passes all wavelengths. The second position of each filter reflects a particular wavelength to a corresponding add/drop GRIN lens collimator that receives the reflected light and outputs it into an add/drop fiber. The outputs from the add/drop collimators are directed to a single add/drop fiber through use of a power combiner. Light that passes through all of the filters is directed into a second network interface GRIN lens collimator for the purpose of coupling the light onto a second network optical fiber. A carrier wavelength can also be entered/added at the add/drop port.

6 Claims, 4 Drawing Sheets

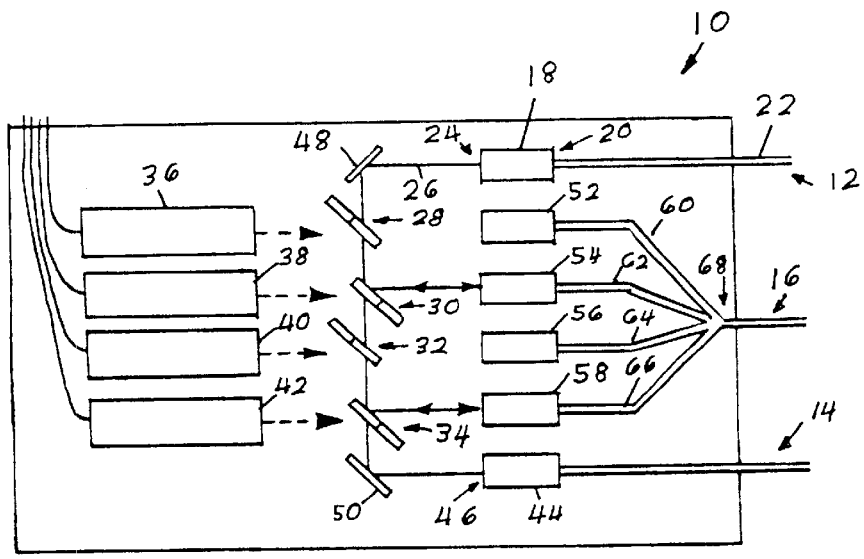
FIG. 1
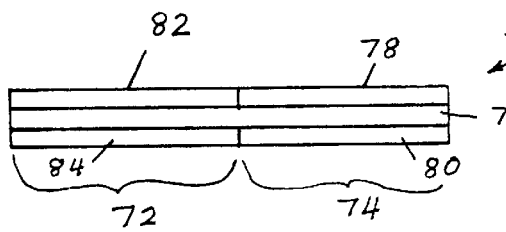
FIG. 2
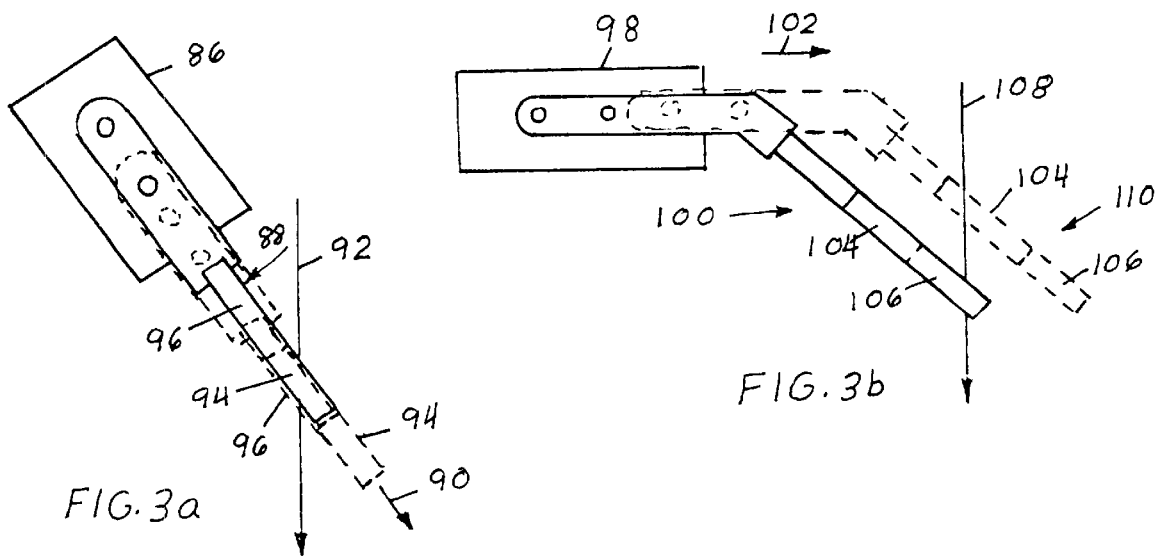
FIG. 3a
FIG. 3b

US 6,407,838 B1

RECONFIGURABLE MULTI-ADD/DROP MODULE FOR OPTICAL COMMUNICATIONS

This application claims benefit of provisional No. 60/144,909 filed Jul. 21, 1999.

BACKGROUND OF THE INVENTION

1. Field of the Invention

The present invention relates generally to optical communications systems, and more particularly to a subsystem for routing wavelengths in an optical communications system through use of slidable two-section channel filters allowing direction of a selected wavelength without interrupting express channels.

2. Brief Description of the Prior Art

Optical communications networks are capable of handling large quantities of data due to their very broad bandwidth. This capability is enhanced through the simultaneous transmission of a plurality of carriers of different wavelengths. A technique known as wavelength division multiplexing is used to place the various carriers on a single optic network and separate the wavelengths at a node for re-routing. A system/module for use in receiving and/or transmitting a selected carrier wavelength at a node in an optical communications system is described in U.S. Pat. No. 5,712,932 by Alexander et al. This system uses circulators and a series of fixed tuned Bragg filters that are switched in or out of the network to receive (drop) or add (transmit) a particular carrier wavelength. A disadvantage of this is that the flow of express channels/wavelengths is disturbed during the switching moments, a problem that can cause a loss of data. A system that avoids the use of switches is described in U.S. Pat. No. 5,706,375 by Mihailov et al. wherein a specific wavelength is selected by tuning a Bragg filter in and out of a corresponding channel. A disadvantage of this system is the complexity and cost of the tuning mechanism.

In view of the prior art discussed above, it is apparent that a need exists for an improved optical add/drop module/system that is amenable to low cost and reliable construction.

SUMMARY

It is therefore an object of the present invention to provide an improved add/drop system for use in an optical communications network.

It is a further object of the present invention to provide an add/drop module that does not disturb the flow of express channels during an add/drop procedure.

It is another object of the present invention to provide an add/drop module that avoids the use of costly Bragg filters.

Briefly, a preferred embodiment of the present invention includes an add/drop module system for use in routing carrier wavelengths through an optical communications network. The system includes a first network interface GRIN lens collimator connected on one end to an optical fiber of a communications network. An output of the GRIN lens is directed to a series of slidable two-section channel filters. Each filter is mechanically movable to a first position that passes all wavelengths. Electrical relays slide the filters from the first position to a second position upon input of a directive signal. The second position of each filter reflects a particular wavelength to a corresponding add/drop GRIN lens collimator that receives the reflected light wavelength and outputs it into an add/drop optical fiber. The outputs from the add/drop collimators are directed to a single add/drop optical fiber through use of a power combiner. Light that passes through all of the filters is directed into a second network interface GRIN lens collimator for the purpose of coupling the light onto a second network optical fiber. Optical carriers arriving on the first network fiber can therefore either be dropped to the add/drop port or passed through for transmission on the second fiber. A carrier wavelength can also be entered added at the add/drop port. In order for an added wavelength to be added to the network, it must correspond to a wavelength of one of the filters, which must be positioned to reflect the signal. With the filter in this position, the added wavelength is reflected and passed to the first GRIN lens collimator which couples the signal onto the first network fiber.

IN THE DRAWING

FIG. 1 is a diagram illustrating a module of the present invention having a node receive/transmit port, an add/drop port, and an express channel port;

FIG. 2 shows the construction of the two-section filter of the present invention;

FIG. 3a illustrates an electromechanical device for positioning the two-section filter along a downward diagonal line relative to a wavelength beam;

FIG. 3b illustrates an electromechanical device for positioning a two-section filter by moving it horizontally, orthogonal to the beam direction;

DETAILED DESCRIPTION OF THE PREFERRED EMBODIMENT

Figure 3C:
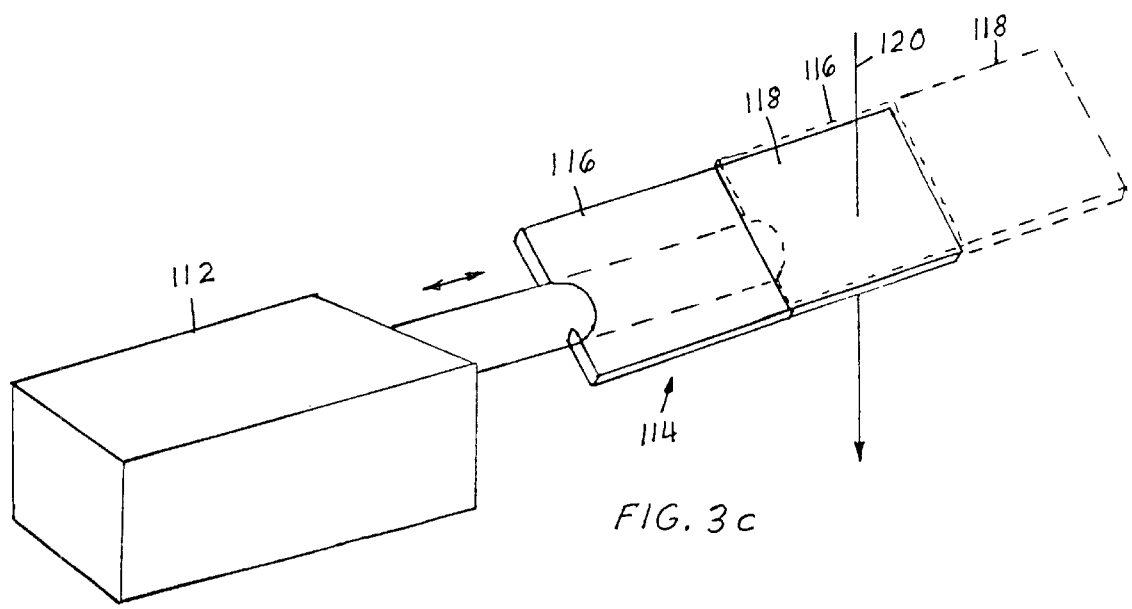
FIG. 3c illustrates the use of an electromechanical device for positioning a two-section filter oriented with the filter sections in a horizontal line.

A preferred embodiment of the present invention is illustrated in FIG. 1 showing a module 10 for use at a node in an optical communications system. The module 10 has a first port 12 for receiving and sending wavelengths from and to a communications network, and a second port 14 for connection to the communications network for passing express channels/wavelengths through the module 10. An express channel is one that at a particular point in time is not to be directed by the module 10 to an add/drop port 16 for reception at the current node. The module 10 includes a first GRIN lens collimator 18 with an input 20 connected to a fiber 22 in communication with an optical communications network. The actual connection or connectors in the module are not shown, as well as other details that will be readily understood by those skilled in the art. The output 24 of the collimator 18 directs or receives a beam 26 to or from a series of two-section channel filters 28–34. Although four filters are shown, the invention includes any number of filters. Each filter 28–34 is slidably set by a corresponding electromechanical apparatus 36–42. The electromechanical construction details of the apparatus 36–42 for sliding filters 28–34 are not shown because such details will be readily apparent to those skilled in the art. A second GRIN lens collimator 44 is included to receive any wavelengths at input 46 that are not reflected by one of the filters 28–4, i.e. any channels that are not to be received by the system node in which the module 10 is included. These wavelengths will be termed "express" channels.

Broadband mirrors 48 and 50 included in the embodiment of FIG. 1 are optional alternative apparatus for conveniently redirecting the beam 26 for a preferred location of components including the input/outputs 12, 14 and 16. Add/drop GRIN lens collimators 52–58 are included to transform any wavelengths in the form of beams reflected by filters 28–34 from or to fiber cables 60–66. An optical power divider represented by the junction 68 is included to direct any wavelengths on fibers 60–66 from filters 28–34 to pass through to fiber 16, i.e. wavelengths to be dropped. In the other direction for adding wavelengths to a network, the power divider 68 provides for wavelength inputs on line 16 to be transferred through lines 60–66 and output as beams from collimators 52–58 to be reflected off of corresponding filters 28–34. An added wavelength, upon reflection from a filter, travels into the end 24 of collimator 18 and then out to fiber 22. For example, an incoming wavelength on fiber 22 may enter collimator 18, be output as a beam 26, reflected by mirror 48 and by filter 30, designed and set to reflect the particular incoming wavelength. The beam then enters the collimator 54 and is passed on to fiber 62 and through combiner 68 to fiber 16, whereupon it can be received by a receiver (not shown).

Similarly, a wavelength generated by a transmitter (not shown) may be input on line 16, passed through combiner 68 to fiber 62, through the collimator 54, and output as a beam reflected from filter 30 and passed through filter 28, reflected by mirror 48, input to collimator 18, and output on fiber 12 for transmission on a network (not shown).

The design of the novel two-section filter is illustrated in FIG. 2. A filter 70, similar to filters 28–34, has a channel selective reflecting section 72 and a transmissive section 74. The filter 70 is constructed on a transparent substrate 76. The transmissive section 74 preferably has an antireflective coating on each side 78, 80 of the transparent substrate to provide minimum transmission loss of all wavelengths passing through section 74. The reflective section 72 has a wavelength-selective reflecting thin film layer 82 on one side, and an antireflective coating 84 on the opposite side.

The main reason for including the transmissive section 74 in the filter, rather than simply sliding a wavelength selective reflecting filter in and out of the beam path as required, is to eliminate the discontinuous interface between the reflective filter edge and air, which would cause a momentary disruption to a wavelength as the edge crossed the wavelength beam path.

With the electromechanical apparatus 36–42 all directed to slide the corresponding two section filters 28–34 so as to place the transmissive sections in the beam path, all the channels are passed into the express output 14. Activating one of the apparatus 36–42 to place a reflective section 72 in the beam path causes the wavelength reflected by the selected filter to be reflected into the corresponding GRIN lens collimator 52–58, and out through the power combiner 68 and add/drop port. Also, as explained above, a wavelength can be injected at port 16, which is then directed out port 12. In a similar manner, any number of the filters 28–34 can be activated at the same time to add or drop corresponding wavelengths from or to port 16.

The movement of the filter by the electromechanical apparatus is more clearly illustrated in FIGS. 3a, 3b, and 3c. FIG. 3a illustrates an apparatus 86 for sliding a filter 88 in the direction of arrow 90 from a first position indicated by the solid outline for passing a beam 92 through a transparent filter section 94. In this position, the reflective section 96 is removed from the beam 92 path. The dashed filter outline shows the filter 88 moved in the direction 90 to place the reflective section 96 in the beam path.

FIG. 3b shows an apparatus 98 for moving a filter 100 in direction 102. The filter 100 has two sections 104 and 106. The solid outline shows section 106 in the beam 108 path. The dashed outline 110 shows the filter 100 section 104 in the beam path.

FIG. 3c shows another arrangement of apparatus 112 for moving a filter 114 with sections 116 and 118 from a first position indicated by the solid lines with section 118 in the beam 120 path to a second position (dashed outline) putting section 116 in the beam 120 path.

Figure 4:
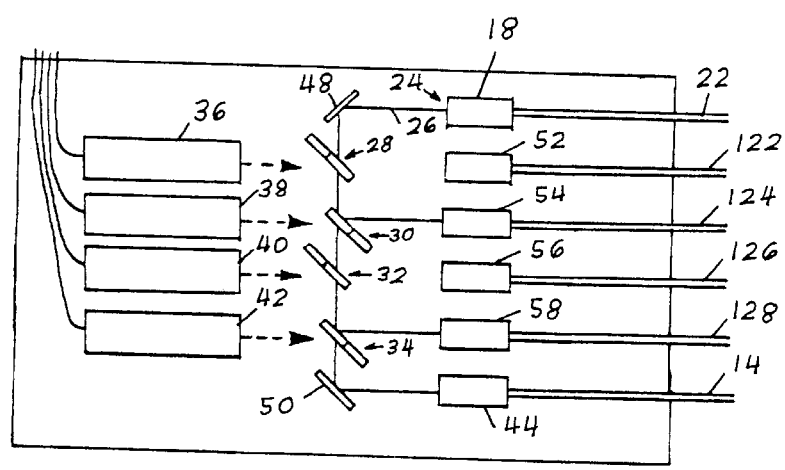
FIG. 4 is a schematic of a module with a separate add/drop line for each channel.

FIG. 4 illustrates an alternate module embodiment wherein the wavelengths reflected by filters 28–34 are not served by the combiner 68 of FIG. 1, but instead each wavelength is added or dropped from or to a separate source or destination through fiber lines 122–128.

Figure 5:
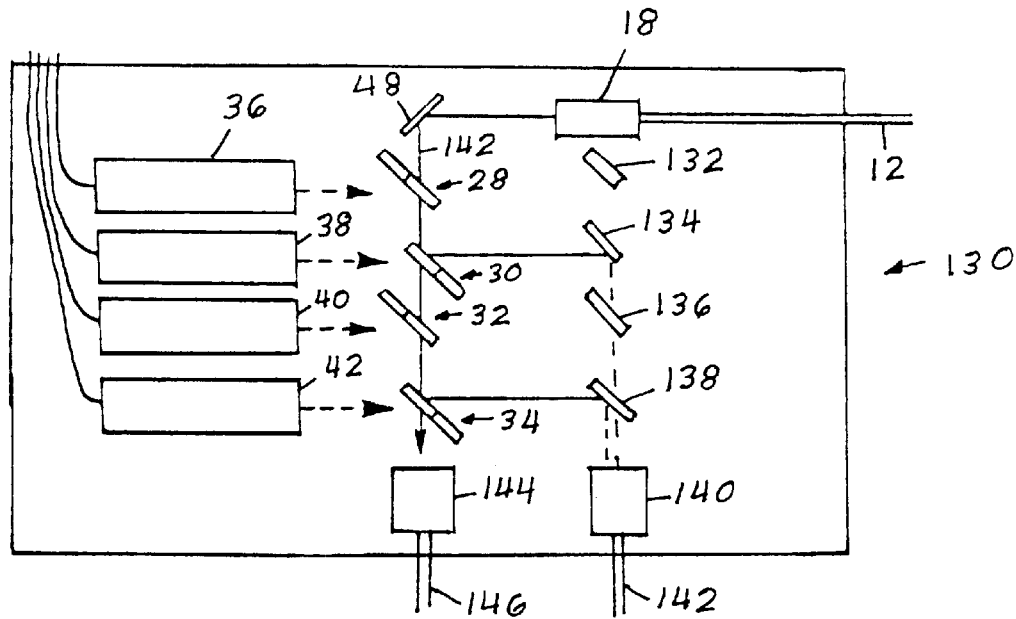
FIG. 5 is a schematic of a module that requires only one collimator in the add/drop section.

FIG. 5 shows an alternate embodiment 130 that performs in a similar manner to the module described in reference to FIG. 1. Instead of the four collimators 52–58 of FIG. 1, reflective elements 132–138 are used to direct the wavelengths to a single collimator 140. The first element 132 reflects a wavelength reflected by filter 28 when the reflective section 72 (FIG. 2) is positioned to intersect the beam 142. Element 132 can be either a mirror, reflection of any wavelength, or a reflective filter that only reflects the wavelength reflected by section 72 of filter 28. Elements 134–138 are single channel reflective filters, each reflecting the same wavelength as its corresponding filter 30–34 and passing other wavelengths. For example, filters 32 and 136 must reflect the same wavelength. In further example, filters 136 and 138 must pass the wavelengths reflected by filters 28, 30, 132 and 134 to allow corresponding incoming wavelengths at port 12 to pass through to the collimator 140 to port 142. Incoming wavelengths at port 12 that are not reflected by filters 28–34 are express channels and pass through to output collimator 144 and to port 146. Wavelengths entering port 142 from a transmitter (not shown) that correspond to the wavelengths reflected by filters 28–34 and 132–138 can be directed out port 12 if the required one of filters 28–34 is positioned to reflect the beam.

Figure 6:
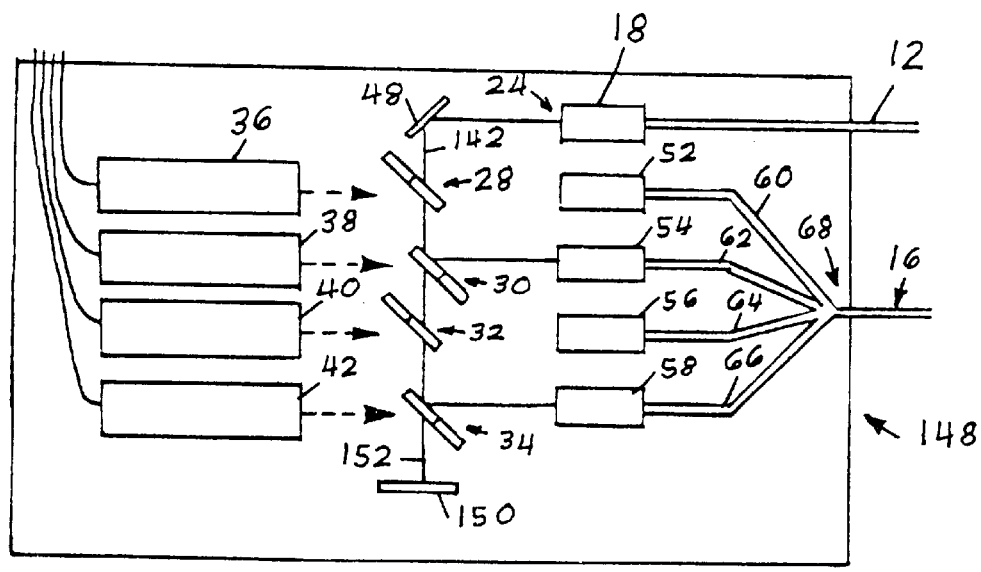
FIG. 6 illustrates a module providing bi-directional operation.

An alternate module embodiment 148, similar to the one shown in FIG. 1 except configured for bi-directional operation, is illustrated in FIG. 6. The angled mirror 50 and collimator 44 of FIG. 1 have been replaced with a mirror 150 oriented to reflect the beam 152 containing express wavelengths, i.e. those not reflected by filters 28–34, back along the same path through the filters 28–34, and reflected off mirror 48 and through collimator 18 and out port 12.

Figure 7:
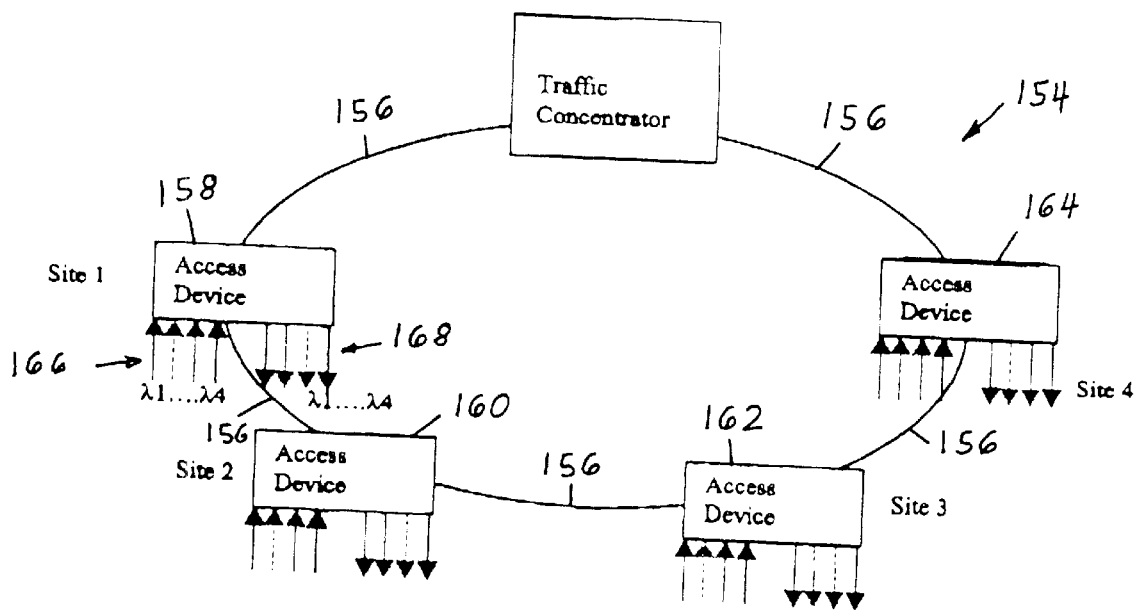
FIG. 7 illustrates a communications system with access devices.

A typical optical communications network application of the modules described above is illustrated in FIG. 7. A ring architecture 154 includes fiber optic lines 156 interconnecting access devices 158–164. In application of the present invention, each access device could include one or more of the modules described above. Arrows 166 and 168 indicate the capability of the access device to add (transmit) wavelengths and drop (receive) wavelengths to and from the network respectively. According to the above module description, the added and/or dropped wavelengths may be accomplished through a single fiber optic input, such as port 16 in FIGS. 1 and 6, or each wavelength can have a separate line, such as in FIG. 4. Other combinations variations of the above modules will be apparent to those skilled in the art, and these are included in the spirit of the present invention. For example, a module could be configured with a combination of a number of add/drop channels combined through a combiner such as in FIG. 1 and in addition one or more channels having separate lines such as in FIG. 4.

Figure 8B:
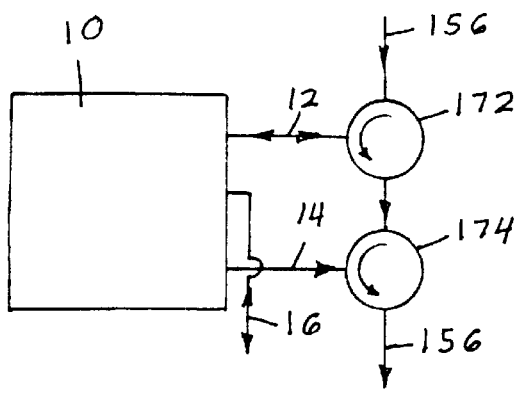
FIG. 8b shows a method of connecting a module with a separate express channel port to a network.
Figure 8A:
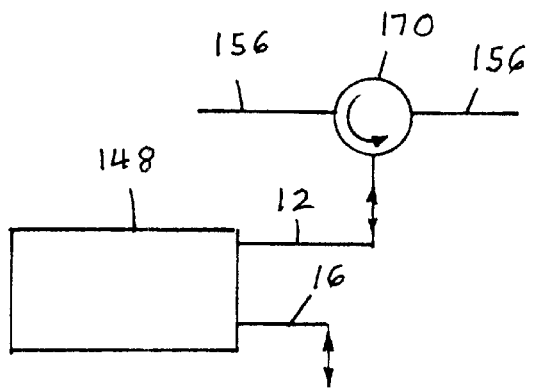
FIG. 8a shows a method of connecting a bi-directional module to a network.

Various ways of connecting the modules of the present invention to a network will be apparent to those skilled in the art. FIG. 8a is an example showing connection of the module of FIG. 6 to the network fiber line 156 through use of an optical circulator 170. FIG. 8b illustrates the use of two circulators 172, 174 for use in connecting a module such as module 10 of FIG. 1 to a network fiber 156.

Although the present invention has been described above in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

It is claimed that:

1. An optical communications apparatus comprising: a module including
   (a) input/output port apparatus for receiving an optical wavelength from an optical communications network, and for sending an optical wavelength to be transmitted through said communications network;
   (b) add/drop port apparatus for outputting/dropping an optical wavelength from said network, and for inputting/adding a wavelength to be transmitted to said network;
   (c) filter apparatus including one or more filter assemblies, each said assembly having a channel filter with a reflective section for reflecting a particular wavelength and passing other wavelengths, and each said assembly having a positioning apparatus responsive to a first signal for positioning a particular said reflective section to reflect a wavelength received at said input/output port to said add/drop port, and for reflecting a wavelength input/added to said add/drop port for passage to said input/output port for transmission to said network; and
   (d) express port apparatus for transmitting wavelengths received through said input/output apparatus that are not reflected by said filter apparatus to said add/drop port apparatus.

2. An apparatus as recited in claim 1 wherein said express port apparatus passes said wavelengths not sent to said add/drop port apparatus back to said input/output port for transmission on said network.

3. An apparatus as recited in claim 1 wherein said express port apparatus outputs wavelengths not sent to said add/drop port apparatus to a dedicated express port.

4. An apparatus as recited in claim 3 wherein said add/drop port apparatus includes a single add/drop port through which all wavelengths to be added or dropped are passed.

5. An optical communications apparatus comprising: a module including
   (a) input/output port apparatus for receiving an optical wavelength from an optical communications network, and for sending an optical wavelength to be transmitted through said communications network;
   (b) add/drop port apparatus for outputting/dropping an optical wavelength from said network, and for inputting/adding a wavelength to be transmitted to said network, and wherein said add/drop port apparatus includes a single add/drop port through which all wavelengths to be added or dropped are passed; and
   (c) filter apparatus including one or more filter assemblies, each said assembly having a channel filter with a reflective section for reflecting a particular wavelength and passing other wavelengths, and each said assembly having a positioning apparatus responsive to a first signal for positioning a particular said reflective section to reflect a wavelength received at said input/output port to said add/drop port, and for reflecting a wavelength input/added to said add/drop port for passage to said input/output port for transmission to said network; and
   wherein said add/drop apparatus includes a collimator corresponding to each said filter for directing a said wavelength in the form of a beam between said filter and a first end of said collimator, and for transferring said wavelength between a fiber optic cable and a second end of said collimator, and each said fiber feeding into a power combiner to said single add/drop port.

6. An optical communications apparatus comprising: a module including
   (a) input/output port apparatus for receiving an optical wavelength from an optical communications network, and for sending an optical wavelength to be transmitted through said communications network;
   (b) add/drop port apparatus for outputting/dropping an optical wavelength from said network, and for inputting/adding a wavelength to be transmitted to said network, and wherein said add/drop port apparatus includes a single add/drop port through which all wavelengths to be added or dropped are passed; and
   (c) filter apparatus including one or more filter assemblies, each said assembly having a channel filter with a reflective section for reflecting a particular wavelength and passing other wavelengths, and each said assembly having a positioning apparatus responsive to a first signal for positioning a particular said reflective section to reflect a wavelength received at said input/output port to said add/drop port, and for reflecting a wavelength input/added to said add/drop port for passage to said input/output port for transmission to said network; and
   wherein said add/drop apparatus includes a single wavelength add/drop reflective filter corresponding to each of one or more of said channel filters, wherein each said add/drop filter is for intercepting and reflecting a wavelength reflected by said channel filter into a single collimator for outputting wavelengths reflected by said channel filter to said single add/drop port.

* * * * *